Figure 1:
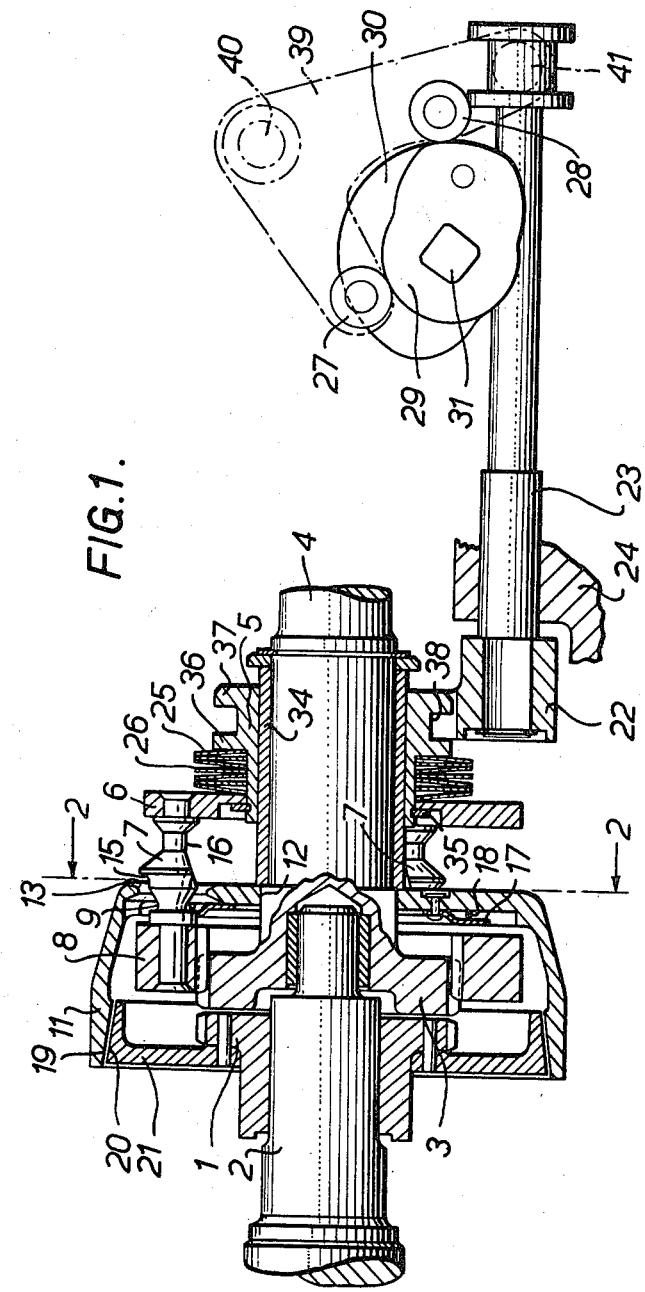

March 30, 1965  C. HENDERSON  3,175,662
FRICTIONAL AND POSITIVE CLUTCH
Filed Feb. 26, 1963  3 Sheets-Sheet 1

INVENTOR
CYRIL HENDERSON
By Moore, Hall & Pollock
ATTORNEYS

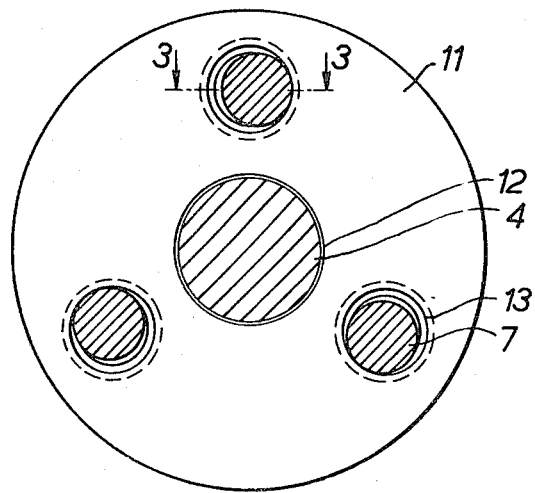
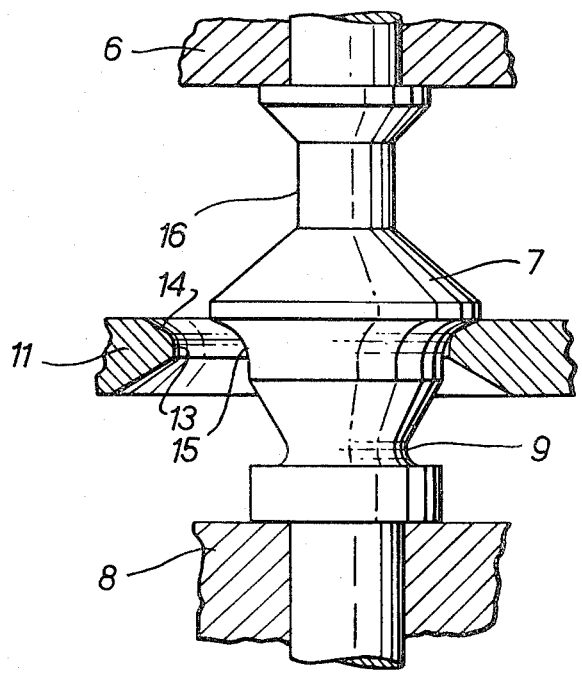

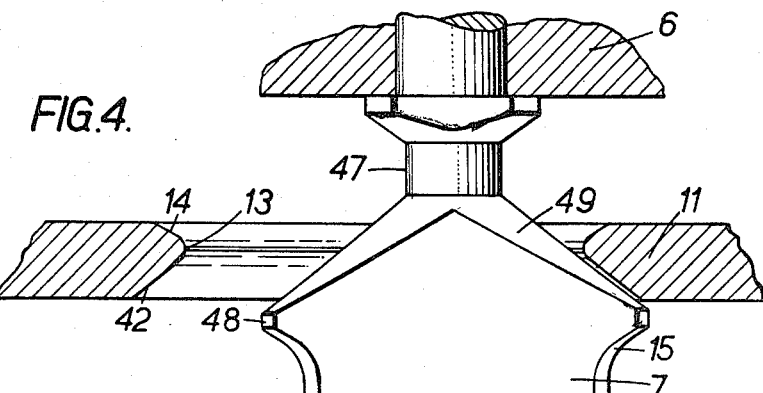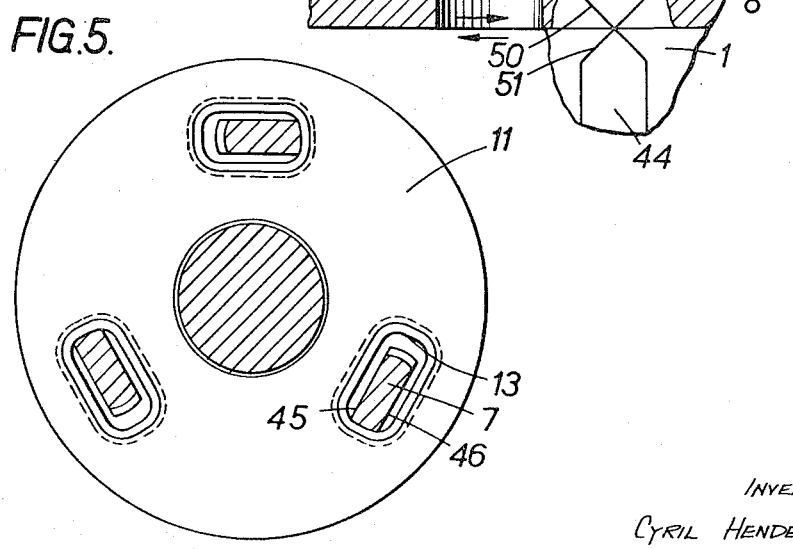

United States Patent Office 3,175,662
Patented Mar. 30, 1965

3,175,662
FRICTIONAL AND POSITIVE CLUTCH
Cyril Henderson, Derby, England, assignor to S. Smith & Sons (England) Limited, London, England, a British company
Filed Feb. 26, 1963, Ser. No. 261,012
11 Claims. (Cl. 192—53)

The present invention relates to dog clutches and associated actuating mechanisms forming an improved baulking type synchromesh, and is more particularly concerned with structures of the type described adapted to be used in conjunction with automatic transmission systems in a vehicle.

The dog clutches of the present invention have auxiliary friction surfaces and baulking surfaces which, during engagement of the clutches, bring the members of the clutch to synchronism and positively prevent engagement of the dogs until synchronism has been achieved. In such clutches the two principal members carrying the dogs are relatively rotatable about an axis, one of the members being fixed axially and the other being slidable to bring about engagement and disengagement of the dogs (these members will be referred to as the fixed member and slidably member respectively). An auxiliary member (also rotatable about the common axis) is movable axially, within limits, in relation to each of the two principal members and has a rotational lost-motion connection with one of the principal members (normally the slidable one). This principal member has one or more baulking surfaces which are inclined in rotational directions to a plane at right angles to the axis and which may engage corresponding surfaces on the auxiliary member. The other principal member has an annular frictional surface which may engage a corresponding surface on the auxiliary member. The arrangement is such that during engagement of the clutch if the principal members are not synchronised the baulking surfaces engage preventing engagement of the dogs and also causing the frictional surfaces to engage to bring about synchronism. When synchronism is achieved the inclined baulking surfaces move out of engagement permitting the dogs to engage. Whilst synchronism is taking place the frictional surfaces are loaded axially by forces transmitted through the baulking surfaces. The rotational frictional force which brings about synchronism and is transmitted between the auxiliary member and the principal member having baulking surfaces is, in conventional constructions, not transmitted primarily through these surfaces but through other surfaces which are at right angles to the said plane.

According to the invention there is provided a dog clutch of the kind referred to, and an associated actuating mechanism, wherein during engagement prior to synchronism being achieved the rotational force transmitted between the auxiliary member and the principal member having baulking surfaces is at least initially transmitted primarily through the engaged baulking surfaces, and wherein the associated actuating mechanism during engagement resists axial movement of the sliding principal member in the disengaging direction with an axial force greater than the axial force initially applied to bring about engagement.

It will be seen that when the initial axial engaging force is applied through the baulking surfaces to the frictional surfaces a rotational frictional force is generated which is transmitted between the auxiliary member and the principal member with baulking surfaces primarily through the baulking surfaces. On account of the inclination of these surfaces this force tends to drive back the sliding principal member in the disengaging direction. Such a tendency raises particular problems in automotive transmissions of the automatic type since, in such automatic transmissions, the members of the gear box are moved by an automatic actuator whose movement, when moved in the engaging direction, is irreversible. The aforementioned tendency to drive the sliding principal member in the disengaging direction is resisted, in the structure of the present invention, by an axial force greater than the initial engaging force, and to the extent that such reverse movement of the sliding principal member still occurs, the structure of the present invention includes resilient means permitting limited such reverse movement during a clutch engaging operation. Moreover, the greater resisting axial force produced by the arrangement of the present invention is necessarily applied to the frictional surfaces. The resultant rotational frictional force is thereby increased and the time taken for synchronism to be achieved is reduced.

Preferably the initial engaging force is applied to the sliding principal member through compressible spring means by an actuating member whose movement in the engaging direction is irreversible, whereby during engagement of the said sliding member in the disengaging direction results in an axial force being applied to the frictional surfaces which is greater than the initial engaging force. Such an irreversible actuating member is conventionally employed in automatic automotive transmissions. The use of such compressible spring means permits a slight rearward movement of the sliding principal member in the disengaging direction under the previously described circumstances, even though the actuating member is moving irreversibly in a clutch engagement direction, thereby giving the arrangement of the present invention special advantages in automatic transmissions.

Preferably the baulking surfaces used in the present invention are shaped so that the effective inclination of the baulking surfaces, where they engage, varies according to the axial position of the said sliding member, so that movement in the engaging direction decreases this effective angle of inclination.

It will be seen that during engagement reverse movement of the said sliding member reduces the extent to which the rotational force transmitted through the baulking surfaces tends to drive back this member (or part) in the axial direction, so enabling a state of equilibrium to be achieved.

A dog clutch and associated actuating mechanism in accordance with this invention, and suitable for incorporation in an automatic transmission system for a vehicle, will now be described with reference to the accompanying drawings, of which—

FIGURE 1 is an axial cross-sectional view of the clutch and actuating mechanism constructed in accordance with one embodiment of the present invention, FIGURE 2 is an axial end view of certain parts of the clutch shown in FIGURE 1, FIGURE 3 is a cross-sectional view of parts of the clutch taken on the line 3—3 of FIGURE 2, FIGURE 4 is a view similar to FIGURE 3 illustrating a modified arrangement embodying the present invention, and FIGURE 5 is a view similar to FIGURE 2 further illustrating said modified arrangement.

Referring initially to FIGURE 1, it will be seen that the clutch system of the present invention includes a toothed input member 1 secured to the end of an input shaft 2. A toothed output member 3 is secured to the end of an output shaft 4, so that the toothed members 1 and 3 are adjacent to one another and have a common axis of rotation. A sleeve 5 is slidable on a fixed inner sleeve 34 on shaft 4. An annular disc 6 is slidable on sleeve 5 at the end nearest output member 3, movement towards this member being limited by a circular clip 35.

Two flanges 36 and 37 at the opposite end of sleeve 5 define between them an annular channel 38. A pair of Belleville spring washers 25 and 26 lie between flange 36 and disc 6 tending to force the disc 6 into engagement with clip 35.

Disc 6 carries, equally spaced around its periphery, three similar baulking pins 7 which are parallel to the common axis of shafts 2 and 4 and which are directed towards output member 3. The pins 7 carry an internally toothed annulus 8 whose teeth mesh with the teeth of output member 3, and may also mesh with the teeth of input member 1 to engage the clutch. The pins 7 each have an annular groove 9 (FIGURES 1 and 3) adjacent to annulus 8 and are each formed with an annular chamfer 15 of concave cross-section facing annulus 8 and adjacent to groove 9. The chamfer 15 is cut-away over those portions of the pins 7 which are nearest to the common axis of shafts 2 and 4. The diameter of each pin 7 is reduced as shown at 16 (FIGURE 3) between chamfer 15 and disc 6. A cup-shaped baulking and friction member 11 co-axial with shaft 4 over-lies but is spaced apart from annulus 8. Member 11 has a central hole 12 in its base, the periphery of which closely encircles output shaft 4 adjacent to output member 3. The pins 7 pass through three corresponding holes 13 in the base of member 11. The edges of the holes 13 which are nearest to disc 6 are provided with a chamfer having a convex cross-section as indicated at 14 (FIGURE 3). The cross-sectional radius of chamfer 14 is somewhat less than that of chamfer 15 on the pins 7. The maximum diameter of pins 7 in the region of chamfers 15 is such as to enable them just to pass through holes 13. A ring-shaped plate 17, whose outer portion is displaced axially with respect to its inner portion, is symmetrically attached by its inner portion to the inner surface of the base of member 11, thus forming an annular pocket opening outwardly. Plate 17 is cut-away in the regions of the three holes 13 in member 11 which it would otherwise overlap to some extent. A split ring 18 is situated in the annular pocket and resiliently engages the three pins 7 on their inner surfaces.

In the vicinity of the rim of member 11 there is formed an internal conical friction surface 19 diverging towards the rim. A corresponding conical friction surface 20 is formed externally on a flange formed on a disc 21 which is secured co-axially to input shaft 2 immediately adjacent to input member 1 on the side away from output member 3. Member 11 has a small range of movement axially, the friction surfaces 19 and 20 being in engagement at one end of the range and the base engaging fixed sleeve 34 at the other end.

A fork 22 engages channel 38 of sleeve 5, the fork being secured to the end of a rod 23 which is slidable in a support 24 in a direction parallel to the common axis of shafts 2 and 4. Rod 23 is positioned between two extreme positions by a pair of cam followers indicated at 27 and 28 which engage a pair of cams 29 and 30. The followers are mounted on a plate 39 which is pivoted at 40 and engages rod 23 at 41. The cams 29 and 30 are mounted on a shaft 31 driven by an electric motor (not shown). The cams 29 and 30 are shaped so that rod 23 is at all times positively located by the cam followers 27 and 28. Furthermore, the arrangement is such that rod 23 cannot be moved by the application of an axial force to the rod. When rod 23 is moved away from the clutch by cams 29 and 30, fork 22 engages flange 37 moving annulus 8 out of engagement with input member 1 thereby disengaging the clutch. In this position ring 18 engages the grooves 9 in pins 7 thereby holding the frictional surface 19 on member 11 out of engagement with the frictional surface 20 on disc 21. Movement of pins 7 in relation to ring 18 is facilitated by the absence of a chamfer on the portions of the pins which are engaged by the ring. When rod 23 is moved towards the clutch to the limit of its range of movement (and disc 6 is in engagement with clip 35) annulus 8 engages member 1. The portions 16 of pins 7 then lie opposite the holes 13 in the base of member 11.

The working of the clutch and actuating mechanism will now be described. It will be assumed that the clutch is dis-engaged and that members 1 and 3 are rotating at different speeds as will normally be the case. Movement of rod 23 towards the clutch causes disc 6 to be forced by spring washers 25 and 26 towards member 3. Pins 7 which are carried by disc 6, exert a pressure on member 1 through ring 18 forcing friction surface 19 into engagement with friction surface 20 of disc 21. These surfaces will of course be rotating at different speeds and the frictional engagement between them will cause pins 7 to bear against the edges of holes 13 so that to some extent chamfers 14 and 15 over-lie one another (see FIGURES 2 and 3). Further movement of rod 23 causes the pins 7 to move in relation to member 11 bringing the chamfers 14 and 15 into engagement, as is best illustrated in FIGURE 3.

Where the initial engagement takes place, the effective angles of inclination of the chamfers in relation to a plane at right angles to the axis will be large, but continued movement causes the areas of engagement to change so that the effective inclination is reduced. An increasing axial force is transmitted through the areas of engagement to member 11, and consequently there is a rapid increase in the rotational frictional force between surfaces 19 and 20. This rotational force is transmitted to pins 7, and due to the inclination of the engaging chamfers, there results an axial component of force tending to force disc 6 away from member 11 and still further increasing the axial loading of surfaces 19 and 20. Rod 23 cannot be driven back (because of the contours of cams 29 and 30) so that spring washers 25 and 26 are compressed. This is of particular value in an automatic transmission since the irreversible nature of rod 23 is characteristic of such transmissions. The slight reverse axial movement of pins 7 results in the area of engagement of chamfers 14 and 15 moving back to regions where the effective angle of inclination is greater. This reduces the axial component of the resultant reaction between member 11 and pins 7. It will be seen that a state of equilibrium is rapidly reached. When synchronization is achieved, the reaction between member 11 and pins 7 is greatly reduced so that the chamfers 15 on the pins can slide in relation to the chamfers 14, permitting annulus 8 to slide into engagement with member 1 under the action of spring washers 25 and 26. During the engagement of the teeth of annulus 8 and member 1 it may be necessary for annulus 8 to move rotationally in relation to member 1 to enable the teeth to fit together. The region 16 of reduced diameter on pins 7 facilitates this relative movement which might otherwise be prevented by sticking of the frictional surfaces 19 and 20. Dis-engagement of the clutch is a straightforward process and need not be described. It will be seen that the rounding of the chamfers 14 and 15 enables the axial load between friction surfaces 19 and 20 during engagement to be controlled by appropriate choice of the characteristics of the spring washers 25 and 26.

Chamfers 14 and 15, which constitute baulking surfaces, are differently curved in cross section in such a way as to achieve two results. Firstly, during engagement rotational forces are transmitted between member 11 and pins 7 only through the inclined baulking surfaces, and not primarily through surfaces at right angles to a plane which is itself at right angles to the axis of the clutch, as would be the case in conventional constructions. In consequence the effective axial engaging force is increased as has been explained. Secondly, the differing curvatures assist in limiting this effective force to a desired value (a tendency for the force to increase results in the region of engagement of the chamfers changing so as to reduce the force). This effect is assisted by the Belleville spring washers 25 and 26, whose rate decreases as said spring washers are compressed. Thus during engagement of the clutch, reverse movement of pins 7 resulting in compression of washers 25 and 26 produces a progressively smaller increase in the effective axial engaging force. Since the reverse movement also reduces the tendency for pins 7 to be driven back by the rotational force transmitted through the baulking surfaces, it will be seen that the overall increase in the effective axial engaging force can be limited to a desired value.

Referring now to FIGURES 4 and 5 of the accompanying drawings it will be seen that the shape of the baulking pins 7 is somewhat modified. This modification is intended to assist engagement of the teeth of annulus 8 with those of input member 1 after synchronism is achieved. To this end the width of the pins at 48 adjacent to the concave chamfer 15 has been increased so that the extent of the reduction in width at region 47 between region 48 and the base of the pin where it is secured in disc 6 is also increased. Between regions 48 and 47 there is as previously a chamfer 49 which is straight in cross section.

The inner edges of the holes 13 in the base of member 11 are also provided with a chamfer 42 which is straight in cross section. However, the inclinations of chamfers 49 and 42 are now the same as the inclinations of the chamfers 50 and 51 of the teeth of annulus 8 and member 1 which must ultimately engage. (One tooth of annulus 8 is indicated at 43 in FIGURE 4 and, similarly, one tooth of member 1 is indicated at 44).

Other minor changes in the modified arrangement are that the pins 7 are formed with flats 45 and 46 on the sides facing towards and away from the common axis of the clutch respectively. The holes 13 are consequently now of rectangular form. The inner faces 45 of the pins 7 are provided with transverse grooves 52 for engagement with the previously described split ring 18.

The working of the modified arrangement will now be described. During engagement of the clutch synchronism is achieved in exactly the same way as for the previously described arrangement. After the widest region 48 of pins 7 has passed through the holes 13 there is a slight possibility of the teeth 43 and 44 abutting whilst the conical friction surfaces 19 and 20 are still sufficiently engaged to prevent rotation of member 11 in relation to member 1. It will be seen that, despite this, teeth 43 may engage with teeth 44 by sliding of the chamfers of these teeth one over the other whilst a similar sliding takes place of the chamfers 49 of pins 7 along the chamfers 42 of holes 13. The extent to which the pins 7 are cut-away in the regions 47 is sufficient to permit full engagement of teeth 43 and 44 in this circumstance.

Having thus described my invention, I claim:

1. In combination, a dog clutch comprising a first member having a plurality of dogs, said first member being rotatable about an axis but being axially fixed, a second member having a plurality of dogs, said second member being rotatable about said axis and being movable axially to effect engagement and disengagement of its dogs with the dogs of said first member, a third member rotatable about said axis, said third member having a rotational lost motion connection with said second member and being movable axially, said first and third members having friction surfaces which are selectively engageable, said second and third members having baulking surfaces which are selectively engageable with one another, said baulking surfaces being disposed so as to lie at angles to planes at right angles to the said axis, a fourth member disposed so as to be engageable by said second and third members, an actuating mechanism for said clutch for applying an axial force to said second member in a first direction tending to effect engagement between the dogs of said first and second members, said fourth member being so positioned relative to said first and third members that the initial axial movement of said second member in the direction to effect engagement of the dogs is transmitted by said fourth member from said second member to said third member to cause said friction surfaces to engage, the torque generated at said friction surfaces when said first and second members are rotating at different speeds being operative to effect engagement between said baulking surfaces, said friction surfaces and said baulking surfaces being formed so that, upon engagement of said baulking surfaces, a reverse axial force is applied to said second member in a second direction tending to effect disengagement of said dogs and of a magnitude greater than the axial force applied to said second member in said first direction, said actuating mechanism comprising an actuating member, spring means through which said actuating member is connected to said second member, and means for selectively moving said actuating member in opposing directions to effect both engagement and disengagement of said clutch.

2. The combination claimed in claim 1 wherein said spring means comprises resilient means whose rate decreases upon compression thereof.

3. The combination claimed in claim 1 wherein said spring means comprise at least one Belleville spring washer.

4. The combination of claim 1 wherein each of said baulking surfaces is curved so that the angle between the surface and a plane at right angles to said axis is dependent on the axial position of said plane, the angle between said engaging baulking surfaces and the plane at right angles to the axis at the point of engagement being dependent on the axial position of said second member and decreasing as said second member is moved in the direction tending to effect engagement between said dogs.

5. The combination of claim 1 wherein said means for moving said actuating member comprises a cam and a cam follower.

6. The combination of claim 4 wherein the baulking surface of said second member is concave and the baulking surface of said third member is convex, the average radius of curvature of said concave baulking surface being greater than the average radius of curvature of said convex baulking surface.

7. The combination of claim 6 wherein said third member has a portion extending at right angles to the said axis, said portion being formed with a plurality of holes spaced from said axis, said second member having a plurality of pins projecting parallel to said axis through said holes, said baulking surfaces being formed around the peripheries of said holes and on the sides of the pins respectively.

8. The combination of claim 7 wherein said pins are cut away so that said rotational lost motion is increased as said second member is moved in the direction to effect engagement of the dogs to such an extent that the baulking surfaces can no longer engage.

9. The combination of claim 7 wherein said friction surfaces are conical, said friction surfaces being located at a greater radial distance from said axis than said holes.

10. A dog clutch comprising first and second members mounted for rotation about a common axis, said first and second members also being mounted for axial movement relative to one another and having selectively engageable dogs, friction means having selectively engageable frictional surfaces acting to bring said first and second members to synchronism before engagement of said dogs, and baulking means positively preventing engagement of said dogs until said synchronism is achieved, said baulking means comprising a pair of selectively engageable inclined baulking surfaces extending angularly relative to said common axis and operative to transmit the rotational synchronizing forces generated by said friction means thereby to cause a variation in the loading of said frictional surfaces, said pair of inclined baulking surfaces each being curved, the angle between said baulking surfaces and a plane at right angles to said axis varying with variations in the axial position of the plane, one of said baulking surfaces being concave and the other of said baulking surfaces being convex, the average radius of curvature of said concave surface being greater than the average radius of curvature of said convex surface.

11. The combination of claim 10 wherein said baulking means comprises an auxiliary member formed with a plurality of holes, said baulking means also comprising a member having a plurality of pins projecting through said holes, said pair of baulking surfaces being formed around the peripheries of said holes and on the sides of said pins respectively.

References Cited by the Examiner

UNITED STATES PATENTS

| | | |
|---|---|---|
| 1,886,850 | 11/32 | Tenney. |
| 2,055,970 | 9/36 | Fippard. |
| 2,703,639 | 3/55 | Nystrand. |
| 2,883,021 | 4/59 | Hill. |

FOREIGN PATENTS

| | | |
|---|---|---|
| 654,701 | 6/51 | Great Britain. |

DAVID J. WILLIAMOWSKY, *Primary Examiner.*